United States Patent [19]

Iijima

[11] Patent Number: 4,840,833

[45] Date of Patent: Jun. 20, 1989

[54] INK COMPOSITION AND A PRESSURE SENSITIVE REPRODUCING

[75] Inventor: Zenshiro Iijima, Abiko, Japan

[73] Assignee: Adger Kogyo Co., Ltd., Soka City, Japan

[21] Appl. No.: 157,253

[22] Filed: Feb. 18, 1988

[30] Foreign Application Priority Data

Feb. 19, 1987 [JP] Japan .................. 62-36406
Feb. 19, 1987 [JP] Japan .................. 62-36407

[51] Int. Cl.$^4$ .............................................. B32B 3/00
[52] U.S. Cl. .................................... 428/207; 106/20; 106/22; 427/146; 428/914
[58] Field of Search ............... 106/20, 22; 427/146; 428/207, 914

[56] References Cited

U.S. PATENT DOCUMENTS 4,279,653  7/1981  Makishima et al. .................. 106/20
4,350,531  9/1982  Distler et al. .......................... 106/20

Primary Examiner—Paul Lieberman
Assistant Examiner—Willie J. Thompson
Attorney, Agent, or Firm—Cushman, Darby & Cushman

[57] ABSTRACT

The object of the present invention is to provide a new ink composition and a reproducing material without using any pigment, capable of drawing or reproducing clear white colored letters or patterns on a sheet of black or dark colored paper, cloth, leather or the like, and the letters or patterns drawn or reproduced are easily erasable with the application of water when they become unnecessary. The ink composition of the present invention comprises a white colored water soluble aliphatic sulfate as a coloring matter. The white colored water soluble aliphatic sulfate which can be used in the present invention includes, alkali-salt of lauryl sulfate, myristil sulfate, cetyl sulfate, stearil sulfate and the like, of which alkali-salt includes sodium, potassium, lithium and the like. As the liquid ink composition, a powder of the white colored water soluble aliphatic sulfate is dispersed in a monohydric alcohol. As the pressure sensitive reproducing material, the ink composition comprising a white colored water soluble aliphatic sulfate as a coloring matter is supported on a substratum such as a porous material as a paper, a cloth, a sheet or a film of moisture-absorbing rubber or moisture absorbing plastic.

4 Claims, No Drawings

INK COMPOSITION AND A PRESSURE SENSITIVE REPRODUCING

FIELD OF THE INVENTION

The present invention relates to an ink composition and a pressure sensitive reproducing material to draw easily erasable white colored letters or patterns on a dark or black colored paper, cloth, leather or the like.

DESCRIPTION OF THE PRIOR ART

In general, to draw letters or patterns on a sheet of black or dark colored paper, cloth, leather or the like, white colored inks have been used from the viewpoint of the color contrast.

However, as the conventional white colored inks consist mainly of white pigment, it is not so easy to erase letters or patterns drawn when they become unnecessary.

On the other hand, to reproduce letters or patterns on a sheet of paper, cloth, leather or the like, pressure sensitive reproducing materials such as a carbon paper in which pigments or dyes are applied on substrata such as a paper or a plastic film has been used.

With such pressure sensitive reproducing materials, desired letters or patterns can be reproduced pressure-sensitively using a pressure-applying tool such as a pencil, a ball-point pen, a stylus, a roulette or the like on a sheet of paper, cloth, leather or the like placed under the reproducing material.

However, letters or patterns thus reproduced are usually not fade away and it is rather troublesome to erase them when they become unnecessary.

For example, in such works as sewing, embroidery, lettering or the like, letters or patterns are drafted using the conventional reproducing material, and the reproduced letters or patterns are to be erased at the end of the works. The erasing is usually carried out using a rubber-eraser or the like, however, the operation is very troublesome. Furthermore, a white colored pressure sensitive reproducing material suitable for reproducing white colored letters or patterns on a sheet of black or dark colored paper, cloth, leather or the like has never been proposed.

SUMMARY OF THE INVENTION

The object of the present invention is to provide a new ink composition and a pressure sensitive reproducing material without using any pigment, capable of drawing or reproducing distinct white colored letters or patterns on a sheet of black or dark colored paper, cloth, leather or the like, and the letters or patterns drawn or reproduced are easily erasable with the application of water when they become unnecessary.

DETAILED DESCRIPTION OF THE PREFERRED EMBODIMENTS

The ink composition of the present invention comprises a white colored water soluble aliphatic sulfate as a coloring matter.

It is necessary to use a water soluble aliphatic sulfate as a coloring matter so as to be erased easily white colored letters or patterns drawn or reproduced when they become unnecessary.

The white colored water soluble aliphatic sulfate which can be used in the present invention includes, for example, alkali-salt of lauryl sulfate, alkali-salt of myristil sulfate, alkali-salt of cetyl sulfate, alkali-salt of stearil sulfate and the like, of which the alkali includes sodium, potassium, lithium and the like.

Aliphatic group of the aliphatic sulfate is preferably to have a number of carbon atoms, generally more than eight, preferably more than ten of carbon atoms, and in which the existence of unsaturated carbon bond is allowable.

The white colored water soluble aliphatic sulfate can be molded as a solid type ink composition using a binder and can be used as a tailor's chalk etc., but in general, it is used as a liquid type ink composition or a paste type ink composition.

An aqueous solution of the white colored aliphatic sulfate can provide white colored letters or patterns when drawn and dried. However, as the aqueous solution of the white colored water soluble aliphatic sulfate is colorless and transparent, it is inconvenient to use as an ink.

So, as a liquid ink composition, it is preferable to disperse a fine powder of the white colored water soluble aliphatic sulfate in a non-aqueous liquid medium.

The non-aqueous liquid medium to disperse the fine powder of the white colored aliphatic sulfate is generally selected from monohydric alcohols, which includes saturated alcohol such as methanol, ethanol, propyl alcohol, butyl alcohol, octyl alcohol, unsaturated alcohol such as allyl alcohol, alicyclic alcohol such as cyclohexyl alcohol, aromatic alcohol such as benzyl alcohol or those combination.

The preferable ratio of the monohydric alcohol to the aliphatic sulfate in the ink composition of the present invention is 50-2000 parts by weight, preferably 200-1500 parts by weight of the monohydric alcohol per 100 parts by weight of the aliphatic sulfate.

The liquid ink composition, if necessary, may include additives such as a drying inhibitor as glycerin or a viscosity control agent as water soluble natural or synthetic polymer, for example, methyl cellulose, carboxymethyl cellulose, polyethylene oxide or the like in an aqueous solution form.

When glycerin is added as a drying inhibitor, the preferable ratio is 5-800 parts by weight, preferably 10-600 parts by weight of glycerin and 45-1200 parts by weight, preferably 190-900 parts by weight of the monohydric alcohol per 100 parts by weight of the aliphatic sulfate.

Water soluble polymer as a viscosity control agent may be added by 0.01-5% by weight, preferably 0.05-3% by weight as 1% aqueous solution per total quantity of all the components.

By applying the ink having aforesaid composition, white colored letters or patterns can be drawn on a black or dark colored cloth, paper, leather or the like. Naturally, it may be used to draw letters or patterns on other colored materials.

Thus drawn white colored letters or patterns are composed of water soluble aliphatic sulfate and easily erasable with the application of water.

The liquid ink composition will be explained in detail hereunder using examples;

EXAMPLE 1

To 800 grams of fine white powder of sodium lauryl sulfate, were added and blended 1000 milliliters of normal propyl alcohol, and were added successively 2600 milliliters of normal propyl alcohol and 400 milliliters of glycerin to prepare a dispersion.

Further, 17 grams of 1% aqueous solution of polyethylene oxide (molecular weight: 4,500,000) were added to the dispersion to prepare a white colored ink. With this ink, white colored patterns were drawn on a piece of black colored cloth. The white colored patterns were faded away when they were wiped through with a cloth wetted with water.

EXAMPLE 2

To 800 grams of fine white powder of sodium lauryl sulfate, were added and blended 500 milliliters of isopropyl alcohol and 300 milliliters of amyl alcohol one after another to prepare a white colored ink.

With this ink, white colored patterns were drawn on a piece of black colored cloth. The white colored patterns were faded away when they were wiped through with a cloth wetted with water.

EXAMPLE 3

To 600 grams of fine powder of sodium myristil sulfate, were added and blended 2500 milliliters of normal propyl alcohol and 600 milliliters of glycerin. Then, 15 grams of 1% aqueous solution of polyethylene oxide (molecular weight: 4,500,000) were added to prepare a white colored ink.

With this ink, white colored patterns were drawn on a piece of black colored cloth. The white colored patterns were faded away when they were wiped through with a cloth wetted with water.

As a pressure sensitive reproducing material, the ink composition comprising the white colored water soluble aliphatic sulfate as a coloring matter should be supported on a substratum.

As the substratum, for example, a porous material such as paper, cloth, or a sheet or a film of moisture-absorbing rubber or moisture absorbing plastic can be used.

To manufacture the pressure sensitive reproducing material of the present invention, as the first step, a solution is prepared by dissolving the white colored water soluble aliphatic sulfate in a solvent.

The solvent which can be used preferably for dissolving said aliphatic sulfate includes, not only water, but alkylene glycol such as ethylene glycol, polyalkylene glycol such as polyethylene glycol, ethylene glycol monoalkyl ether such as ethylene glycol monoethyl ether (ethyl cellosolve) or ethylene glycol monobutyl ether (butyl cellosolve) etc. or other organic solvent, or an aqueous solution of such organic solvent as well as an aqueous solution of glycerin.

Higher concentration of aliphatic sulfate solution can be attained by well blending aliphatic sulfate with lower alcohol such as methyl alcohol, ethyl alcohol, propyl alcohol, butyl alcohol, amyl alcohol, hexyl alcohol, heptyl alcohol, octyl alcohol etc. as the first step and successively blending it with said organic solvent or an aqueous solution thereof.

To thus prepared aliphatic sulfate solution, may be added a viscosity control agent such as water soluble polymer, for example, methyl cellulose, carboxymethyl cellulose or polyethylene oxide etc. as an aqueous solution.

Desirable examples of the aliphatic sulfate solution to be used to prepare a reproducing material of the present invention are as follows:

(1) A solution wherein 1–80 parts by weight, preferably 5–30 parts by weight of the white colored water soluble aliphatic sulfate are dissolved in 100 parts by weight of an aqueous solvent which consists of 5–60% by weight, preferably 10–50% by weight of lower alcohol, 3–40% by weight, preferably 5–35% by weight of organic solvent and 20–60% by weight, preferably 30–50% by weight of water.

(2) A solution wherein 1–80 parts by weight, preferably 5–30 parts by weight of the white colored water soluble aliphatic sulfate are dissolved in 100 parts by weight of an aqueous solvent which consists of 5–40% by weight, preferably 10–40% by weight of organic solvent and 60–95% by weight, preferably 60–90% by weight of water.

(3) A solution wherein 0.01–5% by weight, preferably 0.05–3% by weight of an aqueous solution of water soluble polymer (concentration: about 1% by weight) are added to the solution mentioned in said (1) or (2).

The manufacturing process of the pressure sensitive reproducing material of the present invention comprises applying the above-mentioned water soluble aliphatic sulfate solution to a substratum composed of a porous material such as a paper, a cloth, or a sheet or a film of moisture-absorbing rubber or moisture absorbing plastic, evaporating the solvent from the solution and coming out the white colored solid of the aliphatic sulfate contained in the solution on the surface of the substratum.

Evaporation process may be carried out by natural drying, heating, vacuum drying or other various conventional methods.

Thus, the pressure sensitive reproducing material of the present invention is manufactured, in which the aliphatic sulfate is placed on the substratum in a stratum form.

White colored aliphatic sulfate placed on the substratum is recommended to be in a wet state, without drying completely, for example, containing 5–40% by weight of the solvent components remained in it.

With such pressure sensitive reproducing material, desired letters or patterns can be reproduced by placing the reproducing material on a sheet of paper, a piece of cloth or the like, then pressure-sensitively using a pressure applying tool such as a ball-point pen, a pencil, a stylus or a roulette on it.

With such reproducing process, white colored solid material which consists of the aliphatic sulfate transfers to the sheet of paper, the piece of cloth or the like thereunder, and corresponding letters or patterns are reproduced on it.

Thus reproduced letters or patterns fade away immediately by wiping with a sheet of paper, a piece of cloth or a sponge wetted with water.

The pressure sensitive reproducing material of the present invention is useful for sewing, embroidery, lettering etc. which needs the reproduction of letters or patterns.

The pressure sensitive reproducing material of the present invention will be explained in detail hereunder using examples.

EXAMPLE 4

To 800 grams of sodium lauryl sulfate, were added and blended one after another 1 litter of isopropyl alcohol and 1 liter of 20% aqueous solution of polyethylene glycol to prepare a clear solution and successively were added 6 grams of 1% aqueous solution of polyethylene oxide (molecular weight; 4,500,000).

A sheet of blotting paper was dipped into the solution, and the dipped paper was dried to produce a reproducing material with a solid material of sodium lauryl sulfate on its surface.

On a sheet of black paper or a piece of black cloth, was placed the reproducing material, and patterns were drawn on the surface of the reproducing material using stylus to reproduce on the paper or the cloth white colored patterns corresponding to those drawn.

When the reproduced patterns were wiped through with a wet paper or cloth containing small quantity of water, they faded away immediately after.

EXAMPLE 5

To 1 liter of 30% aqueous solution of ethylene glycol, were added 200 grams of sodium lauryl sulfate and blended to prepare a clear solution to which were added 5 grams of 1% aqueous solution of polyethylene oxide (molecular weight: 4,500,000).

A sheet of blotting paper was dipped into the solution, and the dipped paper was dried to produce a reproducing material.

On a sheet of black paper or a piece of black cloth, was placed the reproducing material, and patterns were drawn on the surface of the reproducing material using stylus to reproduce on the paper or cloth white colored patterns corresponding to those drawn.

When the reproduced patterns were wiped through with a wet paper or cloth containing small quantity of water, they faded away immediately after.

EXAMPLE 6

To 700 grams of sodium myristil sulfate, were added and blended successively 1 liter of normal propyl alcohol and 1 liter of 25% aqueous solution of polyethylene glycol to prepare a clear solution.

A sheet of blotting paper was dipped into the solution, and the dipped paper was dried to produce a reproducing material.

On a sheet of black paper or a piece of black cloth, was placed the reproducing material, and patterns were drawn on the surface of reproducing material using stylus to reproduce on the paper or the cloth white colored patterns corresponding to those drawn.

When the reproduced patterns were wiped through with a wet paper or cloth containing small quantity of water, they faded away immediately after.

I claim:

1. An ink composition comprising a fine powder of white colored water soluble alkali salt of aliphatic sulfate selected from the group consisting of lauryl sulfate, myristil sulfate, cetyl sulfate and stearil sulfate dispersed in a monohydric alcohol as a coloring matter, wherein the ratio of the monohydric alcohol to the alkali salt of aliphatic sulfate of 50–2000 parts by weight of the monohydric alcohol per 100 parts by weight of the alkali salt of aliphatic sulfate.

2. A pressure sensitive reproducing material composed of an ink composition supported on a substratum in which the ink composition comprises a white colored water soluble alkali salt of aliphatic sulfate selected from the group consisting of lauryl sulfate, myristil sulfate and stearil sulfate as a coloring matter.

3. The pressure sensitive reproducing material according to claim 2, wherein the substratum is a paper, cloth, a sheet or a film of moisture-absorbing rubber or a sheet or a film of moisture absorbing plastic.

4. A manufacturing process of a pressure sensitive reproducing material which comprises:

applying a solution of white colored water soluble alkali salt of aliphatic sulfate on a substratum, said alkali salt of aliphatic sulfate being selected from the group consisting of lauryl sulfate, myristil sulfate, cetyl sulfate and stearil sulfate dissolved in an aqueous solvent which consists of water, lower alcohol and an organic solvent selected from the group consisting of alkylene glycol, polyalkylene glycol, alkylene glycol monoalkyl ether and glycerin; and evaporating the solvent from the solution to obtain a residue of colored solid material of the alkali salt of aliphatic sulfate contained in the solution on the surface of the substratum.

* * * * *